US008229956B2

(12) United States Patent
Ikeda et al.

(10) Patent No.: US 8,229,956 B2
(45) Date of Patent: Jul. 24, 2012

(54) TEXT MINING DEVICE, TEXT MINING METHOD, AND TEXT MINING PROGRAM

(75) Inventors: Takahiro Ikeda, Tokyo (JP); Yoshihiro Ikeda, legal representative, Chiba (JP); Satoshi Nakazawa, Tokyo (JP); Yousuke Sakao, Tokyo (JP); Kenji Satoh, Tokyo (JP)

(73) Assignee: NEC Corporation, Tokyo (JP)

( * ) Notice: Subject to any disclaimer, the term of this patent is extended or adjusted under 35 U.S.C. 154(b) by 523 days.

(21) Appl. No.: 12/086,190

(22) PCT Filed: Nov. 30, 2006

(86) PCT No.: PCT/JP2006/324410
§ 371 (c)(1),
(2), (4) Date: Nov. 16, 2009

(87) PCT Pub. No.: WO2007/066704
PCT Pub. Date: Jun. 14, 2007

(65) Prior Publication Data
US 2010/0223291 A1    Sep. 2, 2010

(30) Foreign Application Priority Data
Dec. 9, 2005  (JP) ................................. 2005-356074

(51) Int. Cl.
*G06F 17/30* (2006.01)
(52) U.S. Cl. ........ 707/776; 707/771; 707/718; 707/713; 707/706
(58) Field of Classification Search .................. 707/3, 4, 707/5, 776, E17.014, 771, 718, 713, 706; 704/235, 270
See application file for complete search history.

(56) References Cited

U.S. PATENT DOCUMENTS

| 5,995,978 | A | 11/1999 | Cullen et al. |
| 6,112,172 | A * | 8/2000 | True et al. ..................... 704/235 |
| 6,519,562 | B1 * | 2/2003 | Phillips et al. ................ 704/240 |
| 6,757,676 | B1 * | 6/2004 | Sugaya et al. ....................... 1/1 |
| 2002/0178002 | A1 * | 11/2002 | Boguraev et al. ............. 704/235 |
| 2005/0154690 | A1 * | 7/2005 | Nitta et al. ....................... 706/46 |
| 2006/0069673 | A1 * | 3/2006 | Morikawa et al. ................ 707/3 |

FOREIGN PATENT DOCUMENTS

| JP | 7-114572 A | 5/1995 |
| JP | 11-149485 A | 6/1999 |
| JP | 2001-101194 A | 4/2001 |
| JP | 2003-141134 A | 5/2003 |
| JP | 2004-86351 A | 3/2004 |
| JP | 2005-149014 A | 6/2005 |
| JP | 2005-173951 A | 6/2005 |

* cited by examiner

*Primary Examiner* — Hung Vy
*Assistant Examiner* — Lynda Dinh
(74) *Attorney, Agent, or Firm* — Foley & Lardner LLP

(57) ABSTRACT

With respect to each part at which a word included in a characteristic condition defining a characteristic text set designated by a user through the input device appears in text, the characteristic condition assurance degree calculating unit of the text mining device obtains a reliability of the word from the word reliability storage unit to operate a value of a characteristic condition assurance degree for each text by predetermined operation based on all the obtained reliabilities. The characteristic condition assurance degree calculating unit executes operation such that when a value of each reliability is large, a value of a degree of assurance becomes large. The representative text output unit outputs text whose characteristic condition assurance degree is the highest among texts whose characteristic condition assurance degrees are calculated together with its characteristic condition assurance degree.

15 Claims, 12 Drawing Sheets

FIG. 8

| DATA NUMBER | CONTENTS |
|---|---|
| D1 | POWER OF CELLULAR PHONE WAS SUDDENLY TURNED OFF··· |
| D2 | I WANT TO CHANGE CHARGE PLANE OF MY CELLULAR PHONE |
| D3 | I DROPPED MY CELLULAR PHONE INTO WATER··· |
| ⋮ | ⋮ |

| DATA NUMBER | CATEGORY |
|---|---|
| D1 | DEFECT INFORMATION |
| D2 | PROCEDURE |
| D3 | REPAIR |
| ⋮ | ⋮ |

ISSHUKAN MAE NI KATT TA KEITAIDENWA NANO DESU GA MEILU GA ITSUNOMANIKA FOLUDA KARA KIE TE SHIMAU KOTO GA ARU MITAI NANDESU. (CELLULAR PHONE I BOUGHT A WEEK AGO, IT SEEMS THAT MAIL SOMETIMES DISAPPEARS FROM A FOLDER WITHOUT MY KNOWING.)

⇩

1002

| SHUUKAI 0.32 | MEILU 0.44 | NI 0.56 | ATT 0.65 | TA 0.84 | KEITAIDENWA 0.92 | BAITO 0.51 | AIDA 0.35 |
|---|---|---|---|---|---|---|---|
| MEILU 0.85 | AITSU 0.32 | NO 0.54 | MANGA 0.31 | NORUMA 0.44 | GA 0.35 | KIE 0.81 | KASHI 0.22 |
| MASU 0.40 | TO 0.62 | GA 0.46 | ANSHIN 0.25 | SHI 0.24 | TAIHEN 0.21 | DESU 0.48 | |

| DATA NUMBER | TEXT | | | | | |
|---|---|---|---|---|---|---|
| ⋮ | ⋮ | | | | | |
| D15 | WORD NUMBER | 1 | 2 | 3 | 4 | 5 | 6 |
| | WORD | SHUUKAI | MEILU | NI | ATT | TA | KEITAI DENWA |
| | WORD NUMBER | 7 | 8 | 9 | 10 | 11 | 12 |
| | WORD | BAITO | AIDA | MEILU | AITSU | NO | MANGA |
| | WORD NUMBER | 13 | 14 | 15 | 16 | 17 | 18 |
| | WORD | NORUMA | GA | KIE | KASHI | MASU | TO |
| | WORD NUMBER | 19 | 20 | 21 | 22 | 23 | |
| | WORD | GA | ANSHIN | SHI | TAIHEN | DESU | |
| ⋮ | ⋮ | | | | | |

| DATA NUMBER | RELIABILITY OF RECOGNITION RESULT | | | | | |
|---|---|---|---|---|---|---|
| ⋮ | ⋮ | | | | | |
| D15 | WORD NUMBER | 1 | 2 | 3 | 4 | 5 | 6 |
| | RELIABILITY | 0.32 | 0.44 | 0.56 | 0.65 | 0.84 | 0.92 |
| | WORD NUMBER | 7 | 8 | 9 | 10 | 11 | 12 |
| | RELIABILITY | 0.51 | 0.35 | 0.85 | 0.32 | 0.54 | 0.31 |
| | WORD NUMBER | 13 | 14 | 15 | 16 | 17 | 18 |
| | RELIABILITY | 0.44 | 0.35 | 0.81 | 0.22 | 0.40 | 0.62 |
| | WORD NUMBER | 19 | 20 | 21 | 22 | 23 | |
| | RELIABILITY | 0.46 | 0.25 | 0.24 | 0.21 | 0.48 | |
| ⋮ | ⋮ | | | | | |

| CHARACTERISTIC NUMBER | CHARACTERISTIC CONDITION | CHARACTERISTIC TEXT SET |
|---|---|---|
| C1 | MEILU (MAIL), KIERU (DISAPPEAR) | D15,D18,D37,D42 |
| C2 | DENGEN (POWER) | D1,D20,D33 |
| C3 | TSUUWA (TELEPHONE COMMUNICATION) | D24,D25 |

FIG. 14

1401: KEITAIDENWA O TSUKATT TE IRU UCHI NI TOKUNI SAKUJYO TOKA WA SHI TE I NAIN DESU KEDO JYUSHIN MEILU GA FOLUDA KARA KIE TE SHIMAI MASHI TA. (WHILE USING MY CELLULAR PHONE, RECEIVED MAIL DISAPPEARED FROM THE FOLDER WITHOUT DELETION IN PARTICULAR.)

1402:

| KEITAI DENWA 0.75 | O 0.71 | KATT 0.56 | TE 0.64 | RUIJI 0.42 | NI 0.48 | TOKI 0.35 | KUJI 0.33 |
|---|---|---|---|---|---|---|---|
| TO 0.45 | HANASHI 0.52 | TE 0.66 | NAI 0.62 | DESU 0.82 | KA 0.24 | JYUSHIN 0.64 | MEILU 0.60 | GA 0.65 |
| NORU 0.22 | MAE 0.32 | KARA 0.68 | KIE 0.70 | TE 0.62 | SHIMAI 0.65 | ASU 0.55 | | |

FIG. 15

1501: KEITAIDENWA DE MOJI O NYUURYOKU SHITE IRU TOKI NI KYI GA KIKA NAKU NATT TE KIE TE SHIMAT TA MEILU GA ARU N DESU. (I HAVE MAIL WHICH HAS DISAPPEARED DUE TO MALFUNCTION OF A KEY WHILE INPUTTING CHARACTERS ON MY CELLULAR PHONE.)

1502:

| KEITAI DENWA 0.72 | DE 0.70 | MOJI 0.74 | NYUU RYOKU 0.75 | DE 0.40 | IRU 0.64 | TOKI 0.72 | NI 0.71 |
|---|---|---|---|---|---|---|---|
| KYI 0.45 | GA 0.54 | KIKE 0.43 | NAKU 0.66 | NATT 0.68 | TE 0.64 | KIE 0.81 | TE 0.58 | SHI 0.65 |
| ATT 0.33 | TA 0.58 | MEILU 0.62 | GA 0.61 | AU 0.37 | N 0.59 | DESU 0.70 | | |

FIG. 16

```
1601
KINOU KARA MEIKA NO SAITO NI IKE NAKU TE NANDO TAMESHI TE MO ERA NI
NATT TE SHIMAU NO DESU GA KORE WA SAITO NO MONDAI DE WA? (I HAVE
FAILED IN ACCESSING A MANUFACTURER'S SITE SINCE YESTERDAY AND I TRIED
MANY TIMES TO FIND AN ERROR. IS THIS A PROBLEM ON THE SITE SIDE?)
```

1602

| KINOU 0.50 | GA 0.32 | MEILU 0.25 | KAU 0.22 | SAIGO 0.42 | NI 0.48 | KIE 0.20 | AKE 0.22 | TE 0.48 |
|---|---|---|---|---|---|---|---|---|
| SANDO 0.42 | OSHI 0.27 | TE 0.45 | ASU 0.18 | NI 0.24 | ATT 0.34 | TE 0.36 | MORAU 0.38 | MONO 0.34 |
| DESU 0.54 | KA 0.42 | KARE 0.44 | ASAI 0.32 | SOU GOU 0.20 | UNDOU 0.19 | GA 0.23 | | |

TEXT MINING DEVICE, TEXT MINING METHOD, AND TEXT MINING PROGRAM

This application is the National Phase of PCT/JP2006/324410, filed Nov. 30, 2006, which claims priority to Japanese Application No. 2005-356074, filed Dec. 9, 2005, the disclosures of which are hereby incorporated by reference in their entirety.

TECHNICAL FIELD

The present invention relates to a text mining device, a text mining method and a text mining program for analyzing and classifying text based on a word extracted from the text and, more particularly, to a text mining device, a text mining method and a text mining program which enable representative text belonging to a set of texts obtained as a result of mining to be referred to.

BACKGROUND ART

Text mining is processing of, with a set of texts classified into a plurality of categories according a certain classification axis as an input, discovering a characteristic inherent to text belonging to a specific category designated as an analysis target to select a set of texts having the characteristic.

This enables a user to know a characteristic that a designated category has and a specific example (text) relevant to the characteristic.

In text mining in general, text is analyzed and classified based on a word extracted from text, and as a result, a condition formed of a word or of a combination of words as a characteristic (hereinafter, it will be referred to as "characteristic condition") is output and a set of texts matching the condition (hereinafter referred to as "characteristic text set") is further output.

A text mining device according to related art extracts a word from each text to extract a word whose degree of association with text belonging to a category to be analyzed is high or a combination of such words as a characteristic of the category.

Accordingly, with appearance of an extracted word or combination of words as a characteristic condition, the text mining device according to the related art enables output of text including the extracted word or combination of words as a characteristic text set. The characteristic condition and the characteristic text set will be a mining result.

One example of a text mining device of this kind is recited in Literature 1 (Japanese Patent Laying-Open NO. 2003-141134).

The text mining device recited in Literature 1 has a characteristic word extraction processing unit for extracting a characteristic word appearing in text as a target of mining, an analysis axis setting processing unit for setting a classification axis as a reference for analysis and a relating word acquisition processing unit for extracting a word having a high degree of association with each category of the classification axis, thereby extracting a characteristic word in each category of the classification axis set by a user as a reference for analysis.

Another related art text mining device extracts a word from each text to divide text belonging to a category to be analyzed into a plurality of clusters based on a word appearance tendency. In this text mining device, a condition defining a cluster will form a characteristic condition, text belonging to the cluster will form a characteristic text set, and the characteristic condition and the characteristic text set will be a mining result.

One example of a text mining device of this kind is recited in Literature 2 (Japanese Patent Laying-Open No. 2001-101194).

The text mining device recited in Literature 2 has a word cut-out unit for extracting a word from text as a mining target, and a cluster generation unit for evaluating association between extracted words to generate a cluster with text including a set of words whose degree of association is not less than a prescribed value as the same cluster, thereby dividing the text to be mined into a plurality of clusters.

The related art text mining enables a characteristic (characteristic condition) peculiar to text belonging to a specific category to be discovered to obtain a set of texts having the characteristic (characteristic text set).

In general, however, there exist numerous texts satisfying the same characteristic condition to make it difficult for a user to see all the texts in a characteristic text set.

One example of a device for generating an index for order at the time when a user sees texts in a characteristic text set is recited in Literature 3 (Japanese Patent Laying-Open No. 2004-86351).

The text information analysis system recited in Literature 3 has a vector calculation unit for obtaining a vector indicative of each text belonging to a characteristic text set, a center of gravity calculating unit for calculating a center of gravity of each vector, and a degree of association calculating unit for obtaining a degree of association between text and a characteristic text set from a relationship between a vector and a center of gravity, thereby assigning a degree of association with a characteristic text set to each text in the characteristic text set.

This arrangement allows a user to, at the time of seeing texts in a characteristic text set, sequentially see the texts in a descending order of a degree of association with a characteristic text set.

Literature 1: Japanese Patent Laying-Open No. 2003-141134.
Literature 2: Japanese Patent Laying-Open No. 2001-101194.
Literature 3: Japanese Patent Laying-Open No. 2004-86351.

When voice data is formed into text by voice recognition, not all the spoken words are correctly recognized and there is a case where a spoken word is erroneously recognized as a different word. This is also the case with forming image data into text by character recognition, in which not all the written words are correctly recognized and there is a case where a written word is erroneously recognized as a different word.

Text generated by voice recognition or character recognition might include an erroneous word.

The related art text mining devices, however, are premised on input of texts electronically generated in advance, to which no consideration is given to a case of input of text which might include an erroneously recognized word (recognition error) such as a voice recognition result of voice data and a character recognition result of image data.

There might therefore occur a case where even when a user, in order to know a representative example of text satisfying a certain characteristic condition, reads text in a characteristic text set corresponding to the characteristic condition (or original voice data or image data of the text), the user fails to understand the contents due to inclusion of a recognition error in the text.

Also, a user is not allowed to know in advance in a set of characteristic texts, text which has a reduced number of recognition errors therein and whose contents are easy to understand.

In addition, when the text mining device receives input of text including a recognition error, its mining result might include an error. In other words, a characteristic condition and a characteristic text set obtained as a result of mining are not always correct.

Moreover, whether an output characteristic condition is really characteristic in text belonging to a designated category or whether text in an output characteristic text set really satisfies a characteristic condition can be determined only by actual reference by a user to text in the characteristic text set (or original voice data or image data of the text).

Therefore, in order to obtain a representative example of text satisfying a certain characteristic condition, even when a user refers to text in a characteristic text set corresponding to the characteristic condition (or original voice data or image data of the text), the text might fail to actually satisfy the characteristic condition because of inclusion of a recognition error in the text (in other words, the text might not be an appropriate representative example of text satisfying the characteristic condition).

In addition, the user is not allowed to know in advance in a characteristic text set, text which will be an appropriate representative example.

Moreover, most of texts in a characteristic text set corresponding to a certain characteristic condition include a recognition error, so that there might barely exist texts satisfying the characteristic condition.

In this case, it is highly possible that the characteristic condition is not characteristic in practice in text belonging to a designated category.

In a characteristic text set corresponding to the same characteristic condition, however, there in general exist text really satisfying the characteristic condition and text failing to satisfy the characteristic condition in practice, so that it is difficult to determine whether the characteristic condition is appropriate as a mining result or not only by reference to a part of the texts.

Even when referred text fails to satisfy a characteristic condition in practice, for example, there is a possibility that such text was accidentally referred to, so that no determination can be made whether the characteristic condition is appropriate as a mining result only from the fact.

As described in the foregoing, the first problem of the related art text mining device is that when text mining is executed with respect to text including a recognition error, it is impossible for a user to select a representative example of text which has a reduced number of recognition error therein, whose contents are easy to understand and which satisfies a certain characteristic condition.

The reason is that a user is provided with no information indicating approximately how many recognition errors each text in a characteristic text set includes.

The second problem is that when text mining is executed with respect to text including a recognition error, it is impossible to prevent a user from selecting text erroneously considered to satisfy a characteristic condition due to a recognition error in the text.

The reason is, similarly to the reason of the first problem, that a user is provided with no information that indicates approximately how many recognition errors each text in a characteristic text set includes.

The third problem is that when text mining is executed with respect to text including a recognition error, it is difficult for a user to determine whether a characteristic condition is appropriate or not by referring to a part of texts in a characteristic text set obtained as a result of the mining.

The reason is that a user is provided with no information that indicates approximately how many texts which have a possibility of actually satisfying the characteristic condition exist in the characteristic text set.

An exemplary object of the present invention is to provide a text mining device capable of presenting text having little possibility of including a recognition error therein as a representative example of text satisfying a certain characteristic.

Another exemplary object of the present invention is to provide a text mining device capable of presenting, as a representative example of text satisfying a certain characteristic, text having little possibility of being erroneously considered to satisfy the characteristic condition due to a recognition error in the text.

A further exemplary object of the present invention is to provide a text mining device enabling a user to determine whether a mining result is appropriate or not by referring to a part of texts in a text set having a common characteristic.

SUMMARY

According to an exemplary aspect of the invention, a text mining device, includes a text set storage unit for storing a plurality of texts obtained by forming a plurality of non-text data into texts, a reliability storage unit for storing, for each of a plurality of texts stored in the text set storage unit, a reliability of the text which is derived from formation of the non-text data from which the text originates into texts, a text mining unit for executing, with respect to a plurality of texts stored in the text set storage unit, text mining of searching a plurality of texts of the same class having the same characteristic from the plurality of texts, and a text selection unit for reading, for each text of the same class searched by the text mining unit, a reliability of the text from the reliability storage unit to select a part of texts of the same class from the plurality of texts of the same class based on the reliability.

According to an exemplary aspect of the invention, a text mining method to be executed by a text mining device having a text set storage unit for storing a plurality of texts obtained by forming a plurality of non-text data into texts and a reliability storage unit for storing, for each of a plurality of texts stored in the text set storage unit, a reliability of the text which is derived from formation of the non-text data from which the text originates into texts, includes a text mining step of executing, with respect to a plurality of texts stored in the text set storage unit, text mining of searching a plurality of texts of the same class having the same characteristic from the plurality of texts, and a text selection step of reading, when the plurality of texts of the same class are searched, a reliability of each text of the same class from the reliability storage unit to select a part of texts of the same class from the plurality of texts of the same class based on the reliability.

According to an exemplary aspect of the invention, a computer readable medium for storing a text mining program causing a computer to execute text mining processing which computer is connected to a text set storage unit for storing a plurality of texts obtained by forming a plurality of non-text data into texts and a reliability storage unit for storing, for each of a plurality of texts stored in the text set storage unit, a reliability of the text which is derived from formation of the non-text data from which the text originates into texts, the text mining processing including a text mining processing of executing, with respect to a plurality of texts stored in the text set storage unit, text mining of searching a plurality of texts of the same class having the same characteristic from the plurality of texts, and a text selection processing of reading, when the plurality of texts of the same class are searched, a reliability of each text of the same class from the reliability storage unit to select a part of texts of the same class from the plurality of texts of the same class based on the reliability.

BRIEF DESCRIPTION OF THE DRAWINGS

FIG. 8 is a diagram for use in explaining an example of information stored in an original data set storage unit 301;

FIG. 9 is a diagram for use in explaining an example of information stored in a category information storage unit 302;

FIG. 10 is a diagram for use in explaining an example of a recognition result with reliability of original data;

FIG. 11 is a diagram for use in explaining an example of information stored in a text set storage unit 303;

FIG. 12 is a diagram for use in explaining an example of information stored in a word reliability storage unit 304;

FIG. 13 is a diagram for use in explaining an example of information stored in a mining result storage unit 305;

FIG. 14 is a diagram for use in explaining an example of a recognition result with reliability of original data;

FIG. 15 is a diagram for use in explaining an example of a recognition result with reliability of original data; and FIG. 16 is a diagram for use in explaining an example of a recognition result with reliability of original data.

EXEMPLARY EMBODIMENT

Next, a best mode for implementing the present invention will be described in detail with reference to drawings.
(First Mode of Implementation)

Figure 1:
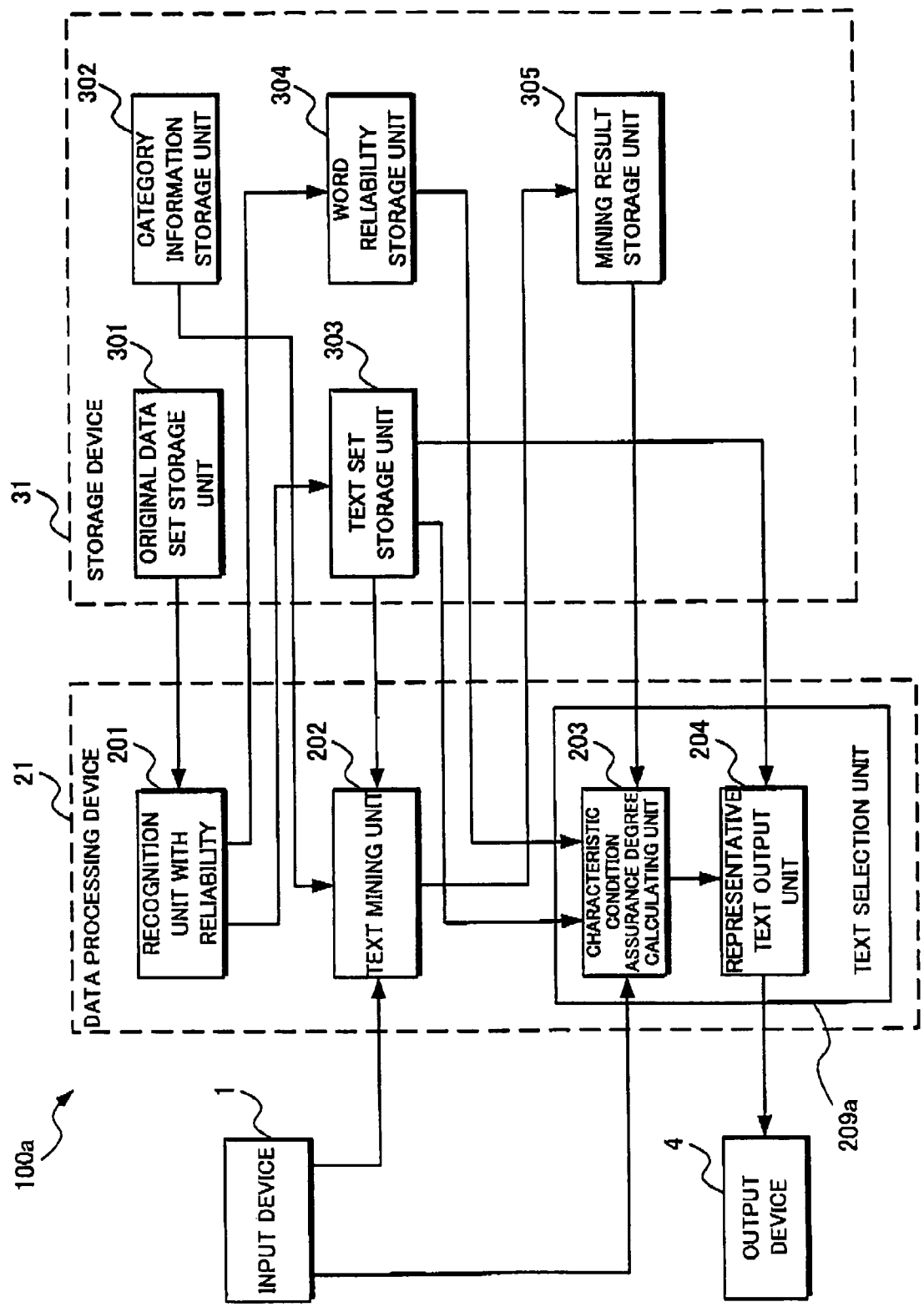
FIG. 1 is a block diagram showing a structure of a first mode of implementation.

FIG. 1 is a block diagram showing a text mining device 100a according to a first mode of implementation of the present invention.

In FIG. 1, the text mining device 100a includes an input device 1 such as a keyboard or a mouse, a program-controlled data processing device 21, a storage device 31 for storing information such as a hard disk, and an output device 4 such as a display device.

The storage device 31 includes an original data set storage unit 301, a category information storage unit 302, a text set storage unit 303, a word reliability storage unit 304 and a mining result storage unit 305.

The original data set storage unit 301 stores in advance a set of a plurality of non-text data such as voice data or image data as a target of mining. These data are divided into a plurality of categories along a certain classification axis in advance.

In correlation with each data stored in the original data set storage unit 301, the category information storage unit 302 stores category information indicative of a category to which the data belongs.

The text set storage unit 303 stores, in correlation with each non-text data stored in the original data set storage unit 301, text obtained by forming the data into text.

The word reliability storage unit 304 stores, for each text obtained by formation from non-text data, reliability of the text derived from formation of the non-text data from which the text originates into text. More specifically, the word reliability storage unit 304 stores, for each text, a word in the text and reliability of the word so as to be correlated with each other.

Reliability of a word is a value indicating approximately with what reliability the word is formed into text. The higher the reliability of a word becomes, the higher the possibility is that the word is proper as a recognition result of non-text data.

The mining result storage unit 305 stores, for a set of texts stored in the text set storage unit 303, a characteristic condition and a set of characteristic texts obtained by text mining.

The data processing device 21 includes a recognition unit 201 with reliability, a text mining unit 202, a characteristic condition assurance degree calculating unit 203 and a representative text output unit 204.

The recognition unit 201 with reliability forms each non-text data stored in the original data set storage unit 301 into text by voice recognition or character recognition and stores a result of the same in the text set storage unit 303. At this time, the recognition unit 201 with reliability obtains reliability of each word of the recognition result and stores the reliability of the word in the word reliability storage unit 304 so as to be correlated with the word.

The recognition unit 201 with reliability obtains, for example, a degree of coincidence (a degree of correlation) between a recognition pattern set in advance and data relevant to a word in non-text data and uses the degree of coincidence (the degree of correlation) as reliability of the word. Reliability is, however, not limited thereto.

The text mining unit 202 extracts a characteristic of text belonging to a category designated by a user through the input device 1 by executing text mining with respect to a text set stored in the text set storage unit 303 and further searches a plurality of texts (texts of the same class) having the characteristic from among texts belonging to the category.

The text mining unit 202 further stores a characteristic obtained by the text mining (hereinafter referred to as "characteristic condition") and a set of texts of the same class (hereinafter referred to as "characteristic text set") in the mining result storage unit 305 so as to be correlated with each other.

Characteristic condition is a condition defined by a word indicative of a characteristic of text belonging to a category designated by a user or a combination of words, which is obtained by text mining.

Extracted as characteristic conditions are, for example, "inclusion of a word W1 and a word W2 in text" or "inclusion of a word W3 in text and non-inclusion of a word W4".

With text represented as a weight vector (word vector) for a word, and a distance between the vectors defined, used as a characteristic condition may be such a condition as "a distance from vector (W1, W2, W3, W4, ..., Wn)=(0.7, 0.4, 0.3, 0.1, ..., Cn) is within 0.3".

Characteristic text set is a set defined for each characteristic condition, which is a set formed of texts satisfying the characteristic condition among texts belonging to a category designated by a user.

The characteristic condition assurance degree calculating unit 203 calculates a characteristic condition assurance degree for each text in a characteristic text set (hereinafter referred to as "set of characteristic texts whose output is designated") designated by a user through the input device 1.

The characteristic condition assurance degree represents how much assurance a part of text in a characteristic text set which is relevant to a characteristic condition that defines the characteristic text set has as a recognition result, and with respect to one text, one characteristic condition assurance degree is calculated for each characteristic text set.

In other words, the characteristic condition assurance degree represents a degree of correlation between text in a characteristic text set and non-text data from which the text originates.

More specifically, the characteristic condition assurance degree calculating unit 203 calculates a characteristic condition assurance degree for text in a characteristic text set by the following manner.

The characteristic condition assurance degree calculating unit 203 obtains, with respect to each part at which there appears in text a word included in a characteristic condition defining a characteristic text set, reliability of the word from the word reliability storage unit 304 to obtain a value of one characteristic condition assurance degree for each text by operation determined in advance from all the obtained reliabilities.

The characteristic condition assurance degree calculating unit 203 executes operation such that when a value of each reliability is large, a value of a degree of assurance becomes large.

Word included in a characteristic condition is a word for use in defining the characteristic condition and in a case, for example, of a characteristic condition that "the word W1 and the word W2 are included in text", the two words, the word W1 and the word W2, are relevant words.

In a characteristic condition, for example, that "a distance from a vector (W1, W2, W3, W4, ..., Wn)=(0.7, 0.4, 0.3, 0.1, ..., Cn) is within 0.3", relevant words are a number n of words, the word W1, W2, W3, W4, ..., Wn.

Used as operation determined in advance are, for example, a total sum of all the reliabilities, an average of all the reliabilities, a maximum value of all the reliabilities and a minimum value of all the reliabilities.

Among texts whose characteristic condition assurance degrees are calculated by the characteristic condition assurance degree calculating unit 203, the representative text output unit 204 outputs text whose characteristic condition assurance degree is the highest as a representative element of a set of characteristic texts whose output is designated together with its characteristic condition assurance degree.

The characteristic condition assurance degree calculating unit 203 and the representative text output unit 204 are included in a text selection unit 209a.

The text selection unit 209a reads reliability of text in a characteristic text set searched by the text mining unit 202 from the word reliability storage unit 304 and based on the reliability, selects text from a characteristic text set as a representative example of the characteristic text set.

Figure 2:
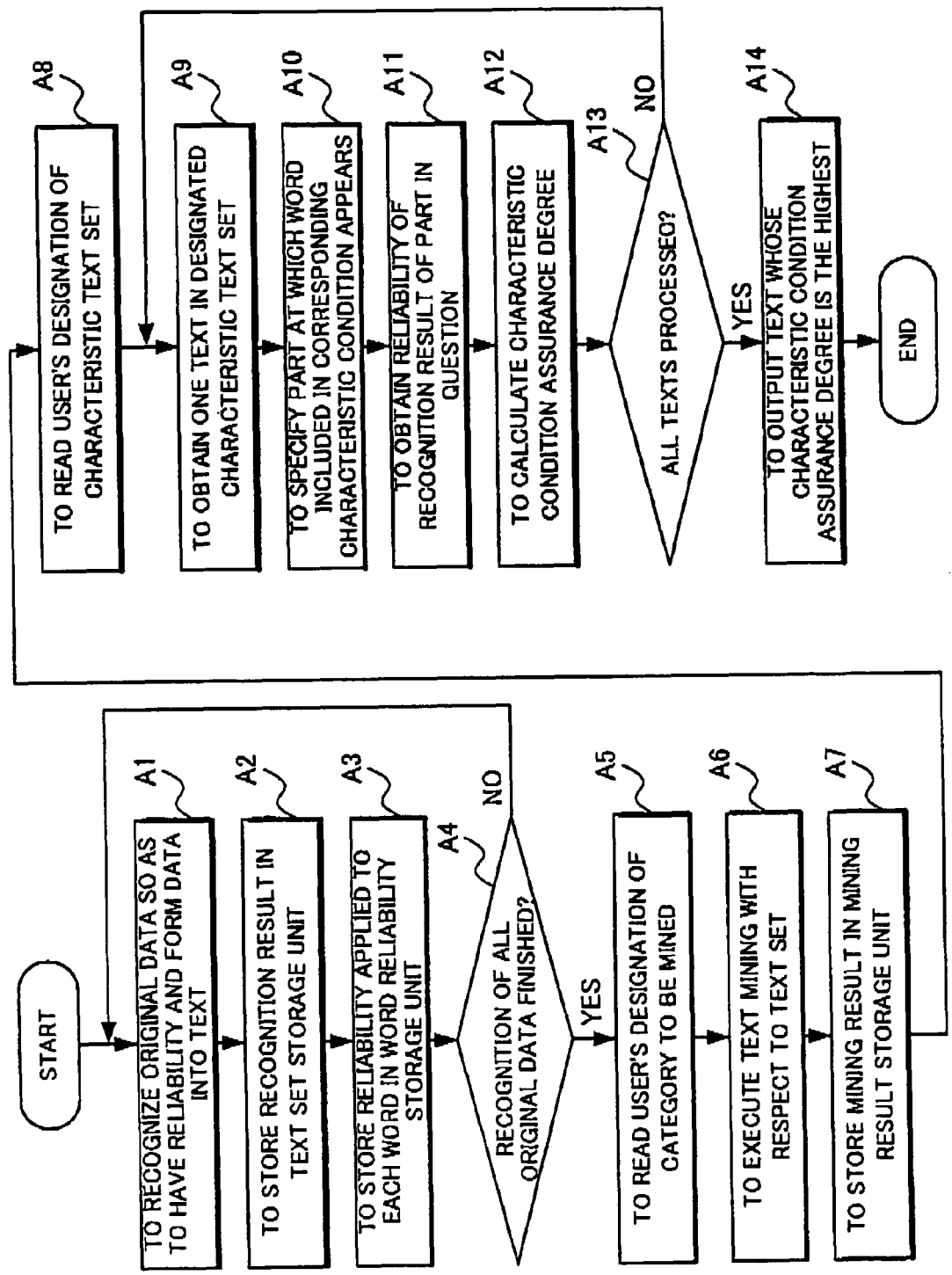
FIG. 2 is a flow chart showing operation of the first mode of implementation.

FIG. 2 is a flow chart for use in explaining operation of the text mining device 100a.

Next, operation of the present mode of implementation will be described in detail with reference to FIG. 1 and FIG. 2.

First, the recognition unit 201 with reliability executes voice recognition with reliability or character recognition with reliability with respect to each data stored in the original data set storage unit 301 to form each data into text, as well as assigning reliability to each word in the text (Step A1).

Thereafter, the recognition unit 201 with reliability stores the text as a result of the recognition in the text set storage unit 303 so as to be correlated with the original data (Step A2).

Thereafter, the recognition unit 201 with reliability stores the reliability assigned to each word in the text as a result of the recognition in the word reliability storage unit 304 so as to be correlated with the text as a result of the recognition (Step A3).

The recognition unit 201 with reliability repeats Steps A1 through A3 until recognition of all the original data is finished (Step A4).

Next, the text mining unit 202 reads a category as a target of mining which is designated by a user through the input device 1 (Step A5).

Thereafter, the text mining unit 202 refers to the category information storage unit 302 to specify a set of texts as a target of mining from the texts stored in the text set storage unit 303. The text mining unit 202 executes text mining with respect to the specified set to obtain characteristics of text belonging to the category designated by the user at Step A5 (more specifically, a characteristic condition, and a characteristic text set defined by the characteristic condition) (Step A6).

Thereafter, the text mining unit 202 stores the obtained result in the mining result storage unit 305 (Step A7).

Subsequently, the characteristic condition assurance degree calculating unit 203 reads the user's designation of a characteristic text set from which a representative example is to be output from the input device 1 (Step A8).

Thereafter, the characteristic condition assurance degree calculating unit 203 obtains one text in the characteristic text set from the text set storage unit 303 (Step A9) to obtain all the parts at which a word included in a characteristic condition defining the characteristic text set appears in the text (Step A10).

Furthermore, the characteristic condition assurance degree calculating unit 203 obtains reliability of a recognition result (word) from the word reliability storage unit 304 with respect to all the parts (Step A11) and executes predetermined operation with respect to a value of each reliability to obtain a characteristic condition assurance degree of the text being noted (Step A12).

The characteristic condition assurance degree calculating unit 203 repeats Steps A9 through Al2 with respect to all the texts in the characteristic text set designated at Step A8 (Step A13).

Lastly, the representative text output unit 204 outputs text whose characteristic condition assurance degree obtained by the characteristic condition assurance degree calculating unit 203 is the highest as a representative example of the characteristic text set designated at Step A8 from the output device 4 together with its characteristic condition assurance degree (Step A14) to end the processing.

Next, effects of the present mode of implementation will be described.

In the present mode of implementation, among texts in a set of characteristic texts whose output is designated, text whose reliability of a recognition result with respect to a word included in a characteristic condition which defines the characteristic text set is high is output as a representative example of the set of characteristic texts whose output is designated.

Word included in a characteristic condition is a word indicative of a main characteristic of text as a representative example. As representative example text, therefore, text can be output which has little possibility of erroneous recognition of a word indicative of a main characteristic of the text and whose contents are easy for a user to understand.

In addition, a word included in a characteristic condition is a word playing an important role at the time of extraction of characteristics in text mining. It is therefore possible to output text which has a less possibility of being erroneously considered to satisfy the characteristic condition due to a recognition error in the text as a representative example.

Also in the present mode of implementation, in a set of characteristic texts whose output is designated, text whose characteristic condition assurance degree indicating how much assurance a part relevant to a characteristic condition has as a recognition result is the highest is selected as a representative example.

When a characteristic condition assurance degree output together with a representative example is low, therefore, other text of the set of characteristic texts whose output is designated also has a low characteristic condition assurance degree, so that a possibility that the characteristic text set is a result of erroneous extraction due to effects exerted by a recognition error at the time of text mining will be increased.

It is therefore possible for a user to determine to a certain extent whether the characteristic condition is an appropriate result or not by checking the characteristic condition assurance degree output together with the representative example.

(Second Mode of Implementation)

Next, a second mode of implementation of the present invention will be detailed with reference to the drawings.

Figure 3:
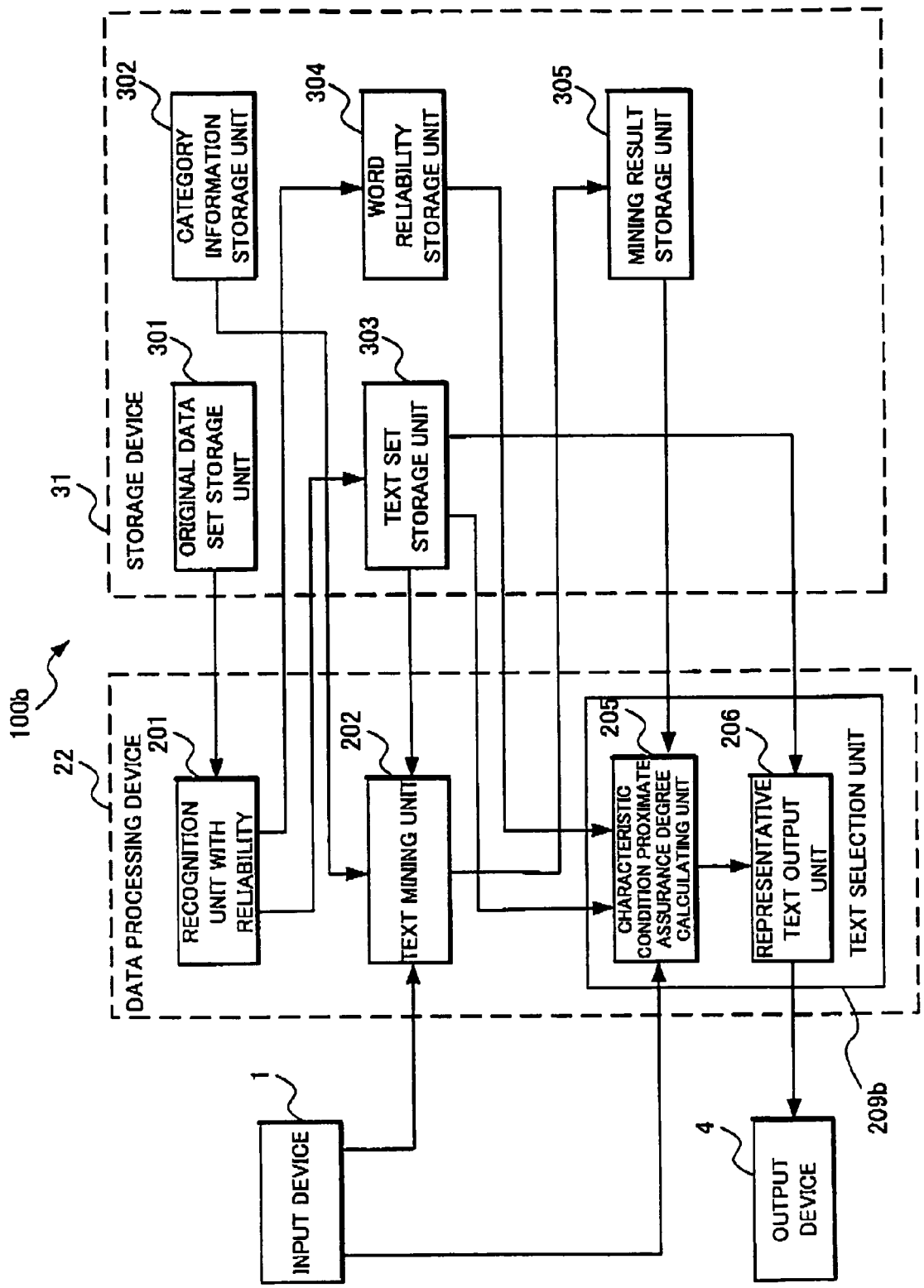
FIG. 3 is a block diagram showing a structure of a second mode of implementation.

FIG. 3 is a block diagram showing a text mining device 100b according to the second mode of implementation of the present invention. In FIG. 3, the same parts as those shown in FIG. 1 are given the same reference numerals.

In FIG. 3, the text mining device 100b differs from the text mining device 100a shown in FIG. 1 in including a data processing device 22 in place of the data processing device 21 shown in FIG. 1.

The data processing device 22 differs from the data processing device 21 in including a characteristic condition proximate assurance degree calculating unit 205 in place of the characteristic condition assurance degree calculating unit 203 and a representative text output unit 206 in place of the representative text output unit 204. The characteristic condition proximate assurance degree calculating unit 205 and the representative text output unit 206 are included in a text selection unit 209b.

In the following, the text mining device 100b according to the second mode of implementation will be described mainly with respect to a difference from the first mode of implementation.

The characteristic condition proximate assurance degree calculating unit 205 calculates a characteristic condition proximate assurance degree for each text in a set of characteristic texts whose output is designated which is designated by a user through the input device 1.

The characteristic condition proximate assurance degree represents how much assurance a word and its proximate part in each text in a characteristic text set which are relevant to a characteristic condition defining the characteristic text set have as a recognition result, and for one text, a value of one characteristic condition proximate assurance degree is calculated for each characteristic text set.

In other words, the characteristic condition proximate assurance degree represents a degree of correlation between text in a characteristic text set (a word and its proximate part relevant to the characteristic condition) and non-text data from which the text originates.

More specifically, the characteristic condition proximate assurance degree calculating unit 205 calculates a characteristic condition proximate assurance degree for text in the characteristic text set by the following manner.

With respect to each part at which a word included in a characteristic condition defining a characteristic text set appears in text, the characteristic condition proximate assurance degree calculating unit 205 obtains reliability of a recognition result of the part and a word in proximity to the part from the word reliability storage unit 304 to obtain, from all the obtained reliabilities, a value of one characteristic condition proximate assurance degree for each text by predetermined operation.

Range of the proximity is determined in advance, for example, by the number of words, the number of characters or the number of sentences.

The characteristic condition proximate assurance degree calculating unit 205 executes operation such that when a value of each reliability is large, a value of a degree of assurance is large similarly to the characteristic condition assurance degree calculating unit 203.

Among texts whose characteristic condition proximate assurance degree is calculated by the characteristic condition proximate assurance degree calculating unit 205, the representative text output unit 206 outputs text whose characteristic condition proximate assurance degree is the highest as a representative element of a set of characteristic texts whose output is designated together with its characteristic condition proximate assurance degree.

Figure 4:
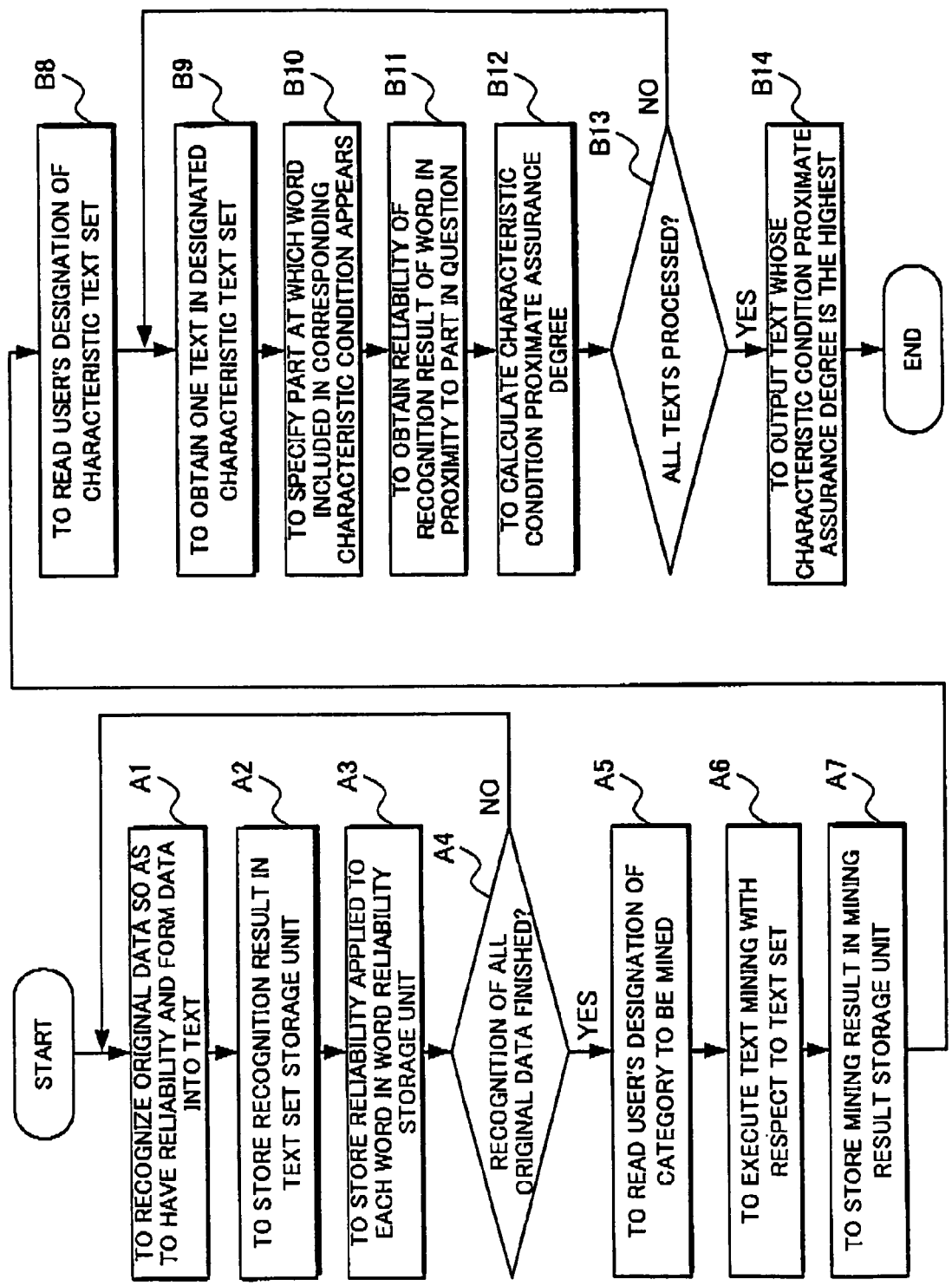
FIG. 4 is a flow chart showing operation of the second mode of implementation.

FIG. 4 is a flow chart for use in explaining operation of the text mining device 100b.

Next, operation of the present mode of implementation will be detailed with reference to FIG. 3 and FIG. 4. In FIG. 4, the same operation as that of the operation shown in FIG. 2 is given the same reference numeral to omit description of the operation in the following.

After the text mining unit 202 operates (Step A7), the characteristic condition proximate assurance degree calculating unit 205 reads, from the input device 1, a user's designation of a characteristic text set from which a representative example is to be output (Step B8).

Subsequently, the characteristic condition proximate assurance degree calculating unit 205 obtains one text in the characteristic text set from the text set storage unit 303 (Step B9) to obtain all the parts at which a word included in a characteristic condition defining the characteristic text set appears (Step B10).

Furthermore, the characteristic condition proximate assurance degree calculating unit 205 obtains a reliability of a recognition result (word) from the word reliability storage unit 304 with respect to words at all the parts and words in proximity to the same (Step B11) and executes predetermined operation with respect to values of these reliabilities to calculate a characteristic condition proximate assurance degree for the text being noted (Step B12).

The characteristic condition proximate assurance degree calculating unit 205 repeats Step B9 through Step B12 for all the texts in the characteristic text set designated at Step B8 (Step B13).

When processing of obtaining a characteristic condition proximate assurance degree is finished for all the texts, the representative text output unit 206 outputs text whose characteristic condition proximate assurance degree is the highest as a representative example of the characteristic text set designated at Step B8 from the output device 4 together with its characteristic condition proximate assurance degree (Step B14) to end the processing.

In the present mode of implementation, characteristic condition proximate assurance degrees indicative of degrees of assurance of recognition results including not only a word relevant to a characteristic condition defining a characteristic text set but also a word in proximity to the word are obtained to output text having the largest value as a representative example of the characteristic text set whose output is designated. Word in proximity to the word indicative of a characteristic has a possibility that it is highly related with the word indicative of the characteristic.

Therefore, a further effect is obtained, in addition to the effect of the first mode of implementation, that text having little possibility can be output that a word of a main characteristic part of the text and its preceding and succeeding parts are erroneously recognized and whose contents are easier for a user to understand.

(Third Mode of Implementation)

Next, a third mode of implementation of the present invention will be detailed with reference to the drawings.

Figure 5:
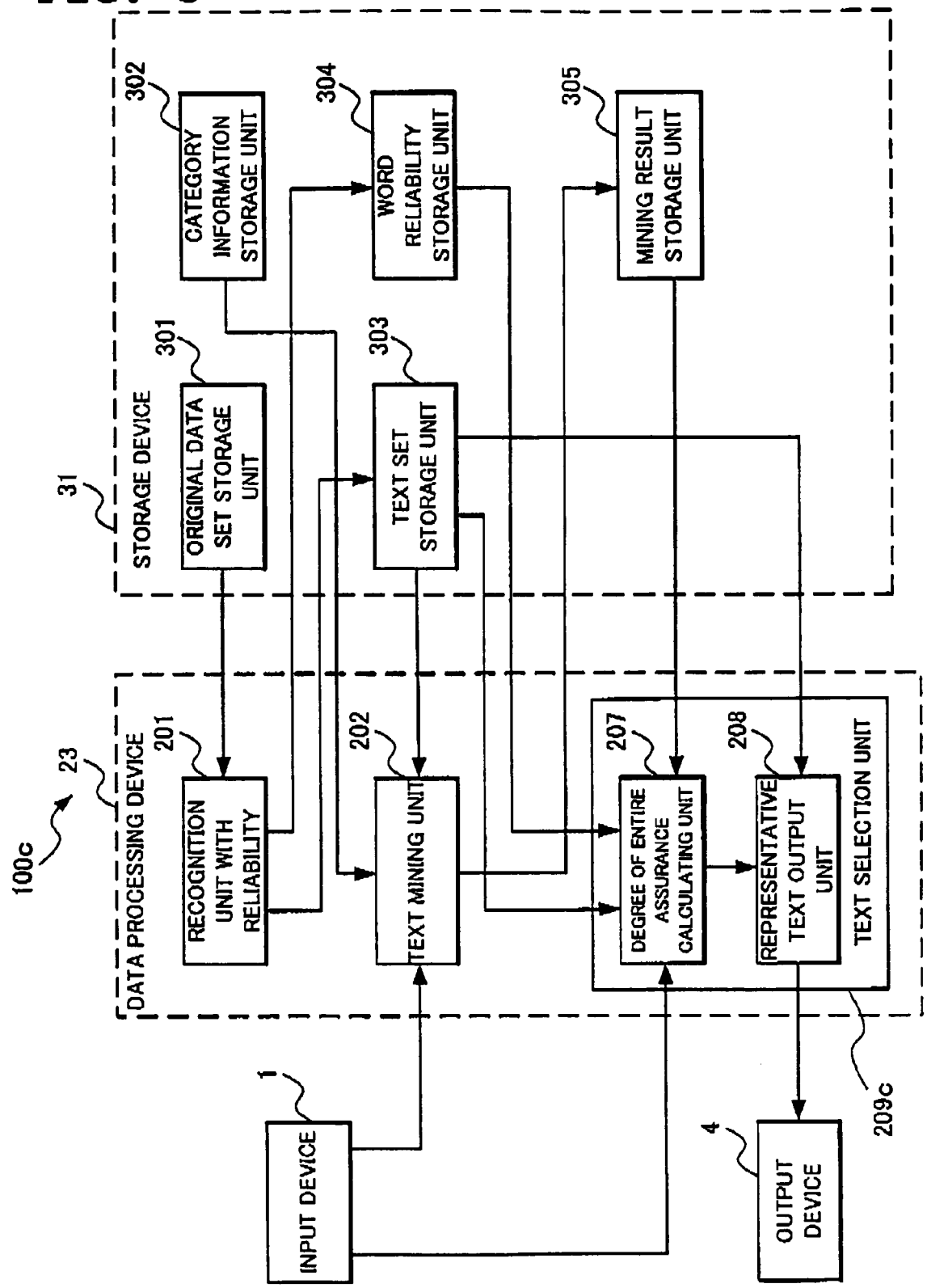
FIG. 5 is a block diagram showing a structure of a third mode of implementation.

FIG. 5 is a block diagram showing a text mining device 100c according to the third mode of implementation of the present invention. In FIG. 5, the same parts as those illustrated in FIG. 1 are given the same reference numerals.

In FIG. 5, the text mining device 100c differs from the text mining device 100a shown in FIG. 1 in including a data processing device 23 in place of the data processing device 21 shown in FIG. 1.

The data processing device 23 differs from the data processing device 21 in including a degree of entire assurance calculating unit 207 in place of the characteristic condition assurance degree calculating unit 203 and a representative text output unit 208 in place of the representative text output unit 204. The degree of entire assurance calculating unit 207 and the representative text output unit 208 are included in a text selection unit 209c.

In the following, description will be made of the text mining device 100c according to the third mode of implementation mainly with respect to a difference from the first mode of implementation.

The degree of entire assurance calculating unit 207 calculates a degree of entire assurance of each text in a set of characteristic texts whose output is designated which is designated by a user through the input device 1.

The degree of entire assurance represents how much assurance one entire text has as a recognition result with respect to each text in a characteristic text set, and for one text, one value of a degree of entire assurance is calculated.

In other words, the degree of entire assurance represents a degree of correlation between text (one entire text) in a characteristic text set and non-text data from which the text originates.

More specifically, the degree of entire assurance calculating unit 207 calculates a degree of entire assurance for text in a characteristic text set by the following manner.

With respect to every word in text, the degree of entire assurance calculating unit 207 obtains a reliability of its recognition result (word) from the word reliability storage unit 304 to obtain one value of a degree of assurance by predetermined operation from all the obtained reliabilities.

Similarly to the characteristic condition assurance degree calculating unit 203, the degree of entire assurance calculating unit 207 executes operation such that when a value of each reliability is large, a value of a degree of assurance becomes large.

Among texts whose degrees of assurance as a whole are calculated by the degree of entire assurance calculating unit 207, the representative text output unit 208 outputs text whose degree of entire assurance is the highest as a representative element of a set of characteristic texts whose output is designated together with its degree of entire assurance.

Figure 6:
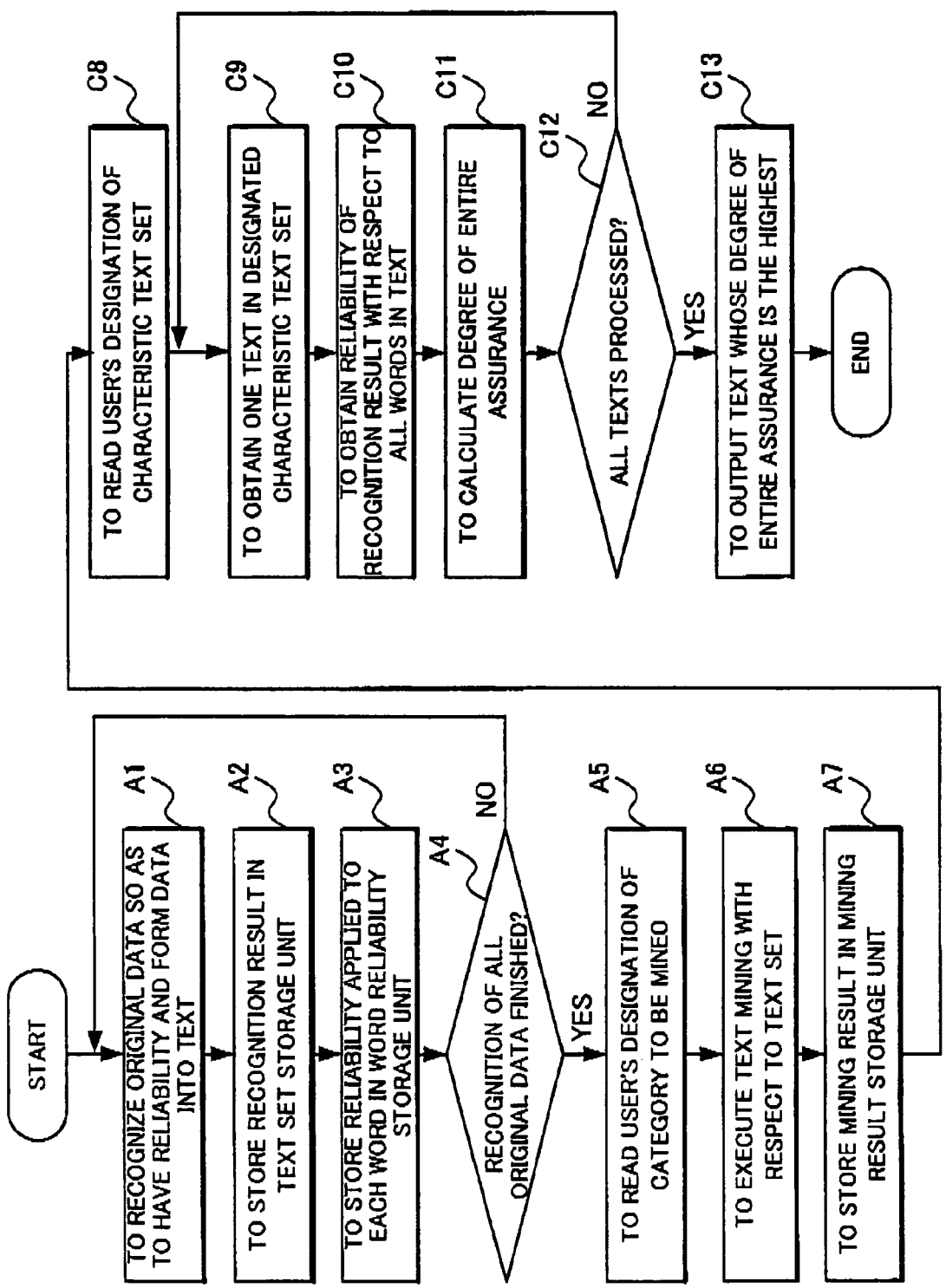
FIG. 6 is a flow chart showing operation of the third mode of implementation.

FIG. 6 is a flow chart for use in explaining operation of the text mining device 100c.

Next, operation of the present mode of implementation will be detailed with reference to FIG. 5 and FIG. 6. In FIG. 6, the same operation as the operation shown in FIG. 2 is given the same reference numeral to omit description of the operation in the following.

After the text mining unit 202 operates (Step A7), the degree of entire assurance calculating unit 207 reads a user's designation of a characteristic text set from which a representative example is to be output from the input device 1 (Step C8).

Subsequently, the degree of entire assurance calculating unit 207 obtains one text in the characteristic text set from the text set storage unit 303 (Step C9) to obtain reliabilities of all the words (recognition results) in the text from the word reliability storage unit 304 (Step C10).

Next, the degree of entire assurance calculating unit 207 executes predetermined operation with respect to values of these reliabilities to calculate a degree of entire assurance for the text being noted (Step C11).

The degree of entire assurance calculating unit 207 repeats Step C9 through Step C11 for all the texts in the characteristic text set designated at Step C8 (Step C12).

When processing of obtaining a degree of entire assurance for all the texts is finished, the representative text output unit 208 outputs text whose degree of entire assurance is the highest as a representative example of the characteristic text set designated at Step C8 from the output device 4 together with its degree of entire assurance (Step C13) to end the processing.

In the present mode of implementation, not only a word relevant to a characteristic condition defining a characteristic text set but also a reliability of a recognition result of all the words in the text are used to obtain a degree of entire assurance of the text and output text whose degree of entire assurance is the highest as a representative example of the characteristic text set whose output is designated.

Therefore, a further effect is obtained, in addition to the effect of the first mode of implementation, of enabling text which is more likely to be properly recognized as a whole and whose contents are easier for a user to understand to be output as a representative example.

(Fourth Mode of Implementation)

Next, a fourth mode of implementation of the present invention will be detailed with reference to the drawings.

Figure 7:
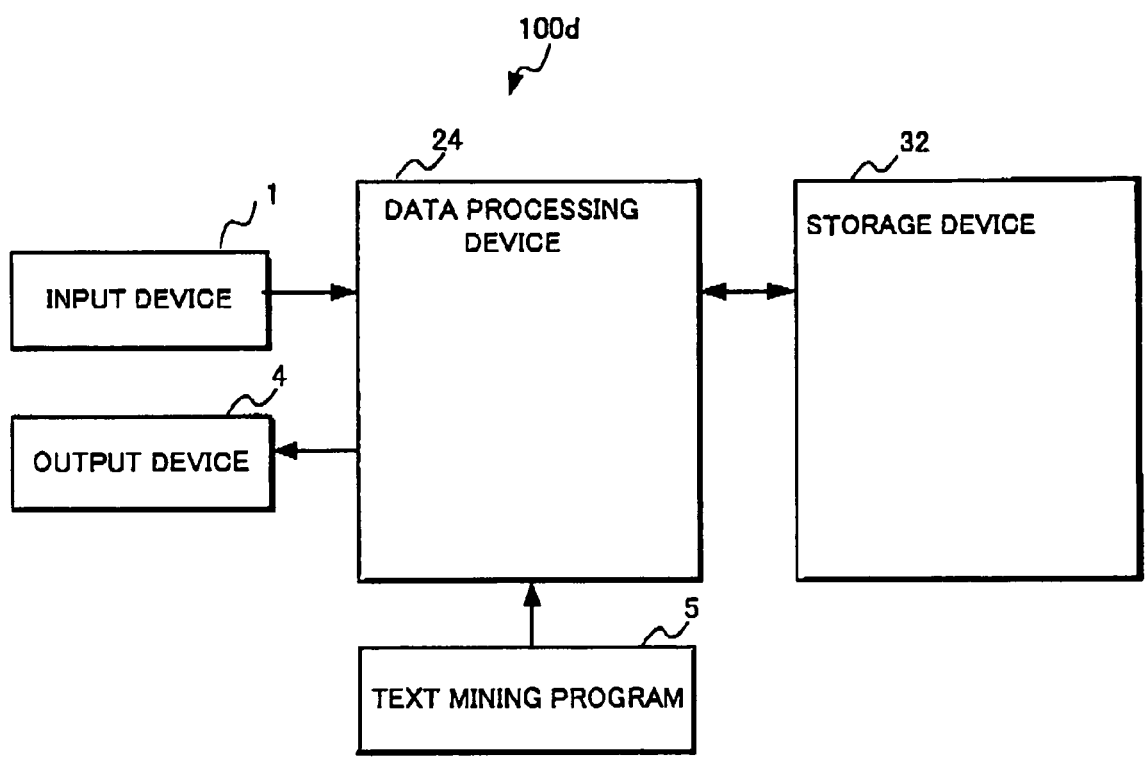
FIG. 7 is a block diagram showing a structure of a fourth mode of implementation.

FIG. 7 is a block diagram showing a text mining device 100d according to the fourth mode of implementation of the present invention. In FIG. 7, the same parts as those illustrated in FIG. 1 are given the same reference numerals.

In FIG. 7, the text mining device 100d comprises the input device 1 and the output device 4 similarly to the first to third modes of implementation and also includes a data processing device 24 such as a computer and a storage device 32 such as a hard disk for storing information.

The data processing device 24 reads a text mining program 5 and executes the text mining program 5 to set a storage region of the storage device 32 similarly to the storage region of the storage device 31 in the first to third modes of implementation.

In addition, the data processing device 24 executes the text mining program 5 to execute the same processing as the processing at the data processing device 21 in the first mode of implementation or as that at the data processing device 22 in the second mode of implementation or as that at the data processing device 23 in the third mode of implementation.

While in the first to fourth modes of implementation, the text mining unit 202 stores a mining result in the mining result storage unit 305, the text mining unit 202 may store a mining result in a main storage device such as a DRAM not shown.

In the first to fourth modes of implementation, at the time of operation for calculating a characteristic condition assurance degree or a characteristic condition proximate assurance degree or a degree of entire assurance, a reliability of a recognition result of each word is uniformly handled. It is, however, possible to weight each word in text in advance from another point of view and before using a reliability of a recognition result of a certain word, multiply the reliability of the word by the weight of the word, thereby giving more importance to a reliability of a word having a larger weight.

(Exemplary Embodiments)

Next, operation of a best mode for implementing the present invention will be described with respect to specific embodiments.

(First Exemplary Embodiment)

First, a first embodiment of the present invention will be described with reference to the drawings. This embodiment corresponds to the first mode of implementation (the text mining device 100a shown in FIG. 1).

Here, description will be made of an example where with voice data applied as original data, the data is formed into text by voice recognition, to which text mining is executed.

In the original data set storage unit 301, a plurality of voice data are stored in advance. Each voice data is waveform data as recoding of contents of some speech or other.

FIG. 8 is a diagram for use in explaining one example of waveform data stored in the original data set storage unit 301.

Although shown in FIG. 8 are speech contents below the waveform data, stored in the original data set storage unit 301 are only waveform data and its data number.

These voice data are classified into a plurality of categories in advance. Stored in the category information storage unit 302 is a category to which each data belongs.

FIG. 9 is a diagram for use in explaining one example of data and a category stored in the category information storage unit 302. As data, the category information storage unit 302 stores a data number of the data.

Next, operation of the first embodiment will be described.

First, the recognition unit 201 with reliability forms each voice data stored in the original data set storage unit 301 into text and obtains a reliability of each word as a recognition result.

Here, description will be made of an example of forming voice data with data number D15 into text.

The voice data with the data number D15 is assumed to be voice data of speech that "Isshukan mae ni katt to keitaidenwa nano desu ga meilu ga itsuno ma ni ka foluda kara kie to shimau koto ga aru mitai nan desu." ("Cellular phone I bought a week ago, it seems that mail sometimes disappears from a folder without my knowing.")

The recognition unit 201 with reliability obtains the voice data from the original data set storage unit 301 and executes voice recognition with reliability to obtain a recognition result with a reliability.

FIG. 10 is a diagram for use in explaining an example of a recognition result with a reliability. In FIG. 10, 1001 represents a voice data with the data number D15 and 1002 represents a voice recognition result with a reliability of the same.

As shown in FIG. 10, text of a voice recognition result is represented as a string of words, to each of which a reliability is assigned indicating to what extent the recognition result is reliable. The higher the reliability is, the greater a possibility of being a proper voice recognition result of the word has. In FIG. 10, a numeric value below each word represents a reliability.

The recognition unit 201 with reliability records, among recognition results obtained by the voice recognition with a reliability, text into the text set storage unit 303 and a reliability of a recognition result into the word reliability storage unit 304. At this time, for enabling use of a reliability of a recognition result for each word in the text, the recognition unit 201 with reliability records the text in the text set storage unit 303 and the reliability of the word in the word reliability storage unit 304 so as to be correlated with each other.

FIG. 11 is a diagram for use in explaining an example of recording of text into the text set storage unit 303. FIG. 12 is a diagram for use in explaining an example of recording of a reliability of a recognition result into the word reliability storage unit 304.

In this example, by the word number, each word in text and a reliability of a recognition result are correlated.

When the recognition unit 201 with reliability forms all the voice data stored in the original data set storage unit 301 into text, the text mining unit 202 subsequently executes text mining with respect to text recorded in the text set storage unit 303 as a target.

The text mining unit 202 first accepts user' designation of a category from which a characteristic is to be extracted by text mining through the input device 1.

Assume here that the user designates a category "defect information".

The text mining unit 202 executes text mining, extracts a characteristic (characteristic condition and a characteristic text set defined by the characteristic condition) in text belonging to the category "defect information" among the texts stored in the text set storage unit 303 and records the extraction result in the mining result storage unit 305.

Assume here that the text mining unit 202 extracts a combination of word appearances in text as a characteristic. Also assume that words differing only in conjugation are considered to be the same.

Assume that the text mining unit 202 extracts three kinds of characteristics with characteristic numbers C1 through C3 shown in FIG. 13 and records the same in the mining result storage unit 305. FIG. 13 is a diagram for use in explaining one example of characteristics recorded in the mining result storage unit 305.

In FIG. 13, a characteristic condition of the characteristic number C1 represents that "text includes words ⌈meilu (mail)⌋ and ⌈kieru (disappear)⌋". This denotes that as one of characteristics of texts belonging to the category "defect information", a characteristic that the word ⌈meilu (mail)⌋ and ⌈kieru (disappear)⌋ are included is extracted.

Also shown is that a characteristic text set of the characteristic number C1 is formed of texts of data numbers D15, D18, D37 and D42. This denotes that among texts belonging to the category "defect information", one satisfying the characteristic condition with the characteristic number C1, that is, those including the words ⌈meilu (mail)⌋ and ⌈kieru (disappear)⌋ are four texts with the data numbers D15, D18, D37 and D42. This is also the case with the characteristic numbers C2 and C3.

When the text mining unit 202 finishes the processing, the characteristic condition assurance degree calculating unit 203 accepts user's designation of a characteristic text set from which a representative example is to be output through the input device 1.

Assume here that the user designates a characteristic text set with the characteristic number C1.

For each text belonging to the characteristic text set with the characteristic number C1, the characteristic condition assurance degree calculating unit 203 calculates a characteristic condition assurance degree of the text.

Assume here that a summation average is used as operation for calculating a characteristic condition assurance degree.

First, description will be made of calculation of a characteristic condition assurance degree with respect to the text of the data number D15.

The characteristic condition assurance degree calculating unit 203 obtains the text with the data number D15 from the text set storage unit 303 to obtain a part in the text at which the words [meilu (mail)] and [kieru (disappear)] included in the characteristic condition with the characteristic number C1 appear.

For the text with the data number D15, the result is obtained that at the position of word numbers 2, 9, and 15, the words [meilu (mail)] and [kieru (disappear)] appear (see FIG. 11).

Next, the characteristic condition assurance degree calculating unit 203 obtains a reliability of a recognition result (word) from the word reliability storage unit 304 with respect to all the relevant parts.

As to the text with the data number D15, as the reliabilities of the words (recognition results) with the word numbers 2, 9, and 15, values, 0.44, 0.8 and 0.81 are obtained, respectively (see FIG. 12).

The characteristic condition assurance degree calculating unit 203 executes predetermined operation, that is, summation average with respect to thus obtained reliability values of the recognition results to obtain a value of 0.70. This value will be the characteristic condition assurance degree for the text with the data number D15.

Also as to other texts belonging to the characteristic text set with the characteristic number C1, more specifically, texts with the data numbers D18, D37 and D42, the characteristic condition assurance degree calculating unit 203 similarly calculates a characteristic condition assurance degree.

Assume here that voice data 1401 with the data number D18 is the voice data 1401 of speaking that "Keitaidenwa o tsukatt te iru uchi ni tokuni sakujyo toka wa shi te i nain desu kedo jyushin meilu ga foluda kara kie te shimai mashi ta." ("While using my cellular phone, received mail disappeared from the folder without deletion in particular.") as shown in FIG. 14.

Also assume that voice data 1501 with the data number D37 is voice data of speaking that "Keitaidenwa de moji o nyuuryoku shite iru toki ni kyi ga kika naku natt te kie te shimat to meilu ga aru n desu." ("I have mail which has disappeared due to malfunction of a key while inputting characters on my cellular phone.") as shown in FIG. 15.

Also assume that voice data 1601 with the data number D42 is voice data of speaking that "Kinou kara meika no saito ni ike naku te nando tameshi te mo era ni natt te shimau no desu ga kore wa saito no mondai de wa?" ("I have failed in accessing a manufacturer's site since yesterday and I tried many times to find an error, is this a problem on the site side?") as shown in FIG. 16.

Also assume that results of voice recognition with a reliability obtained from these voice data by the recognition unit 201 with reliability are as shown in FIG. 14 through FIG. 16. 1402 in FIG. 14 is a voice recognition result with a reliability of the data number D18, 1502 in FIG. 15 is a voice recognition result with a reliability of the data number D37 and 1602 in FIG. 16 is a voice recognition result with a reliability of the data number D42.

At this time, as to the text with the data number D18, as the reliability of the recognition results (words) at a part at which the words [meilu (mail)] and [kieru (disappear)] included in the characteristic condition appear, two values, 0.60 and 0.70 are obtained whose summation average of 0.65 will be a characteristic condition assurance degree.

As to the text with the data number D37, as the reliability of the recognition results (words) at a part at which the words [meilu (mail)] and [kieru (disappear)] included in the characteristic condition appear, two values, 0.60 and 0.62 are obtained whose summation average of 0.61 will be a characteristic condition assurance degree.

As to the text with the data number D42, as the reliability of the recognition results (words) at a part at which the words [meilu (mail)] and [kieru (disappear)] included in the characteristic condition appear, two values, 0.25 and 0.20 are obtained whose summation average of 0.23 will be a characteristic condition assurance degree.

Among all the texts belonging to the characteristic text set with the characteristic number C1, that is, among the texts with the data numbers D15, D18, D37 and D42, the representative text output unit 204 selects text with the data number D15 whose characteristic condition assurance degree is the highest as a representative example of the characteristic text set with the characteristic number C1 to output the text with the data number D15 together with its characteristic condition assurance degree value of 0.70.

In the present exemplary embodiment, as a representative example of the characteristic text set with the characteristic number C1, text with a high reliability of a recognition result of the words [meilu (mail)] and [kieru (disappear)] included in the characteristic condition with the characteristic number C1 is selected.

It is therefore possible to prevent selection of such text as text of the data number D42 whose reliability of a recognition result of the words [meilu (mail)] and [kieru (disappear)] is low and has a great possibility of occurrence of a recognition error at these parts although the characteristic condition of the characteristic number C1 is that "the words [meilu (mail)] and [kieru (disappear)] appear in the text".

It is also found that since the value of the characteristic condition assurance degree of the output representative example is relatively as high as 0.70, the recognition result of the words [meilu (mail)] and [kieru (disappear)] are highly reliable in this representative example, so that there is a great possibility of actual existence of one meeting the characteristic condition with the characteristic number C1.

(Second Exemplary Embodiment)

Next, a second exemplary embodiment of the present invention will be described with reference to the drawings. This exemplary embodiment corresponds to the second mode of implementation (the text mining device 100b shown in FIG. 3).

The second exemplary embodiment will be described here assuming that the same information as that of the first exemplary embodiment is stored in the storage device 31. In the following, the second exemplary embodiment will be described mainly with respect to a difference from the first exemplary embodiment.

When the text mining unit 202 finishes the processing, the characteristic condition proximate assurance degree calculating unit 205 accepts user's designation of a characteristic text set from which a representative example is to be output through the input device 1.

Assume here that the user designates a characteristic text set with the characteristic number C1 similarly to the first exemplary embodiment.

For each text belonging to the characteristic text set with the characteristic number C1, the characteristic condition proximate assurance degree calculating unit 205 calculates a characteristic condition proximate assurance degree of the text.

Assume here that one word each preceding and succeeding a target word are in proximity to the target word. Also assume that the characteristic condition proximate assurance degree calculating unit 205 uses a summation average as operation for calculating a characteristic condition proximate assurance degree.

First, description will be made of calculation of a characteristic condition proximate assurance degree with respect to the text of the data number D15.

The characteristic condition proximate assurance degree calculating unit 205 obtains the text with the data number D15 from the text set storage unit 303 to obtain a part in the text at which the words [meilu (mail)] and [kieru (disappear)] included in the characteristic condition with the characteristic number C1 appear.

For the text with the data number D15, the result is obtained that at the positions of the word numbers 2, 9, and 15, the words [meilu (mail)] and [kieru (disappear)] appear (see FIG. 11).

Next, the characteristic condition proximate assurance degree calculating unit 205 obtains a reliability of a recognition result (word) from the word reliability storage unit 304 with respect to all the relevant parts and parts in proximity to the same.

As to the text with the data number D15, as the reliabilities of the recognition results of the word number 2 and words in proximity to the same, reliabilities, 0.32, 0.44 and 0.56 of the words with the word numbers 1 through 3 are obtained, as the reliabilities of the recognition results of the word with the word number 9 and words in proximity to the same, reliabilities, 0.35, 0.82 and 0.32 of the words with the word numbers 8 through 10 are obtained and as the reliabilities of the recognition results of the word with the word number 15 and words in proximity to the same, reliabilities, 0.35, 0.81 and 0.22 of the words with the word numbers 14 through 16 are obtained (see FIG. 12).

The characteristic condition proximate assurance degree calculating unit 205 executes predetermined operation, that is, summation average with respect to thus obtained reliability values of the recognition results (words) to obtain a value of 0.47. This value will be the characteristic condition proximate assurance degree for the text with the data number D15.

Also as to other texts belonging to the characteristic text set with the characteristic number C1, more specifically, the texts with the data numbers D18, D37 and D42, the characteristic condition proximate assurance degree calculating unit 205 similarly calculates a characteristic condition proximate assurance degree.

As to the text with the data number D18, as the reliabilities of the words (recognition results) at a part at which the words [meilu (mail)] and [kieru (disappear)] included in the characteristic condition appear and words in proximity to the same, six values, 0.64, 0.60, 0.65, 0.68, 0.70 and 0.62 are obtained (see FIG. 14) whose summation average of 0.65 will be a characteristic condition proximate assurance degree.

As to the text with the data number D37, as the reliabilities of the word (recognition result) at a part at which the words [meilu (mail)] and [kieru (disappear)] included in the characteristic condition appear and words in proximity to the same, six values, 0.64, 0.60, 0.58, 0.58, 0.62 and 0.61 are obtained (see FIG. 15) whose summation average of 0.61 will be a characteristic condition proximate assurance degree.

As to the text with the data number D42, as the reliabilities of the recognition results of words in proximity to a part at which the words [meilu (mail)] and [kieru (disappear)] included in the characteristic condition appear, six values, 0.32, 0.25, 0.22, 0.48, 0.20 and 0.22 are obtained (see FIG. 16) whose summation average of 0.28 will be a characteristic condition proximate assurance degree.

Among all the texts belonging to the characteristic text set with the characteristic number C1, that is, among the texts with the data numbers D15, D18, D37 and D42, the representative text output unit 206 selects text with the data number D18 whose characteristic condition proximate assurance degree is the highest as a representative example of the characteristic text set with the characteristic number C1 to output the text with the data number D18 together with its characteristic condition proximate assurance degree value of 0.65.

In the present exemplary embodiment, as a representative example of the characteristic text set with the characteristic number C1, text with a high reliability of a recognition result of parts including not only [meilu (mail)] and [kieru (disappear)] included in the characteristic condition with the characteristic number C1 but also words in proximity to the same is selected.

Therefore, not the text with the data number D15 whose reliability of a part of the words [meilu (mail)] and [kieru (disappear)] is high but the text with the data number D18 whose reliabilities of these parts and their proximities are high is selected as a representative example.

As a result, such text can be considered as a representative example in which a part of "jushin meilu ga" ("received mail") including preceding and succeeding parts of the word [meilu (mail)], and a part of "kara kie te" ("disappeared from") including preceding and succeeding parts of the word "kie" ("disappear") are correctly recognized.

(Third Exemplary Embodiment)

Next, a third exemplary embodiment of the present invention will be described with reference to the drawings. This exemplary embodiment corresponds to the third mode of implementation (the text mining device 100c shown in FIG. 5).

The third exemplary embodiment will be described here assuming that the same information as that of the first exemplary embodiment is stored in the storage device 31. In the following, the third exemplary embodiment will be described mainly with respect to a difference from the first exemplary embodiment.

When the text mining unit 202 finishes the processing, the degree of entire assurance calculating unit 207 accepts user's designation of a characteristic text set from which a representative example is to be output through the input device 1.

Assume here that the user designates a characteristic text set with the characteristic number C1 similarly to the first exemplary embodiment.

For each text belonging to the characteristic text set with the characteristic number C1, the degree of entire assurance calculating unit 207 calculates a degree of entire assurance of the text.

Assume here that the degree of entire assurance calculating unit 207 uses a summation average as operation for calculating a degree of entire assurance.

First, description will be made of calculation of a degree of entire assurance with respect to the text of the data number D15.

The degree of entire assurance calculating unit 207 obtains the text with the data number D15 from the text set storage unit 303 to obtain a reliability of a recognition result of all the words in the text from the word reliability storage unit 304.

The text with the data number D15 is formed of 23 words, and 23 recognition result (word) reliability values are obtained.

The degree of entire assurance calculating unit 207 executes predetermined operation, that is, summation average with respect to thus obtained recognition result reliability values to obtain a value of 0.48. This value will be the degree of entire assurance for the text with the data number D15.

Also as to other texts belonging to the characteristic text set with the characteristic number C1, that is, as to the texts with the data numbers D18, D37 and D42, the degree of entire assurance calculating unit 207 similarly calculates a degree of entire assurance to obtain values of 0.55, 0.600 and 0.34, respectively.

Among all the texts belonging to the characteristic text set with the characteristic number C1, that is, among the texts with the data numbers D15, D18, D37 and D42, the representative text output unit 208 selects the text with the data number D37 whose degree of entire assurance is the highest as a representative example of the characteristic text set with the characteristic number C1 to output the text with the data number D37 together with its characteristic condition proximate assurance degree value of 0.60.

In the present exemplary embodiment, as a representative example of the characteristic text set with the characteristic number C1, text whose recognition result reliability of the words including not only [meilu (mail)] and [kieru (disappear)] included in the characteristic condition with the characteristic number C1 but also every word in the text is high in average is selected.

Therefore, not the text with the data number D15 whose reliability of a part of the words [meilu (mail)] and [kieru (disappear)] is high in particular and the text with the data number D18 whose reliability of a part in proximity to the same is high but the text with the data number D37 whose reliability is high as a whole is selected as a representative example.

As a result, text which includes a reduced number of recognition errors as a whole and whose contents are easier to understand as compared with others can be used as a representative example.

While in the first to the third exemplary embodiments, the description has been made with respect to an example where with voice data applied as original data, the recognition unit 201 with reliability forms the data into text by voice recognition, the present invention can be implemented by the same procedure also in a case where with image data applied as original data, the recognition unit 201 with reliability forms the data into text by character recognition.

The above-described respective exemplary embodiments have the following effects.

The first effect is enabling output of, among texts in a characteristic text set designated by a user from which a representative example is to be output, text which has a reduced number of recognition errors and whose contents are easy for a user to understand as a representative example.

The reason is that among the texts in the characteristic text set designated by the user, text whose reliability of a recognition result of a word included in a characteristic condition defining the characteristic text set (i.e. a part corresponding to a main characteristic of the text) and its proximity part, or of text as a whole is high is output as a representative example.

The second effect is enabling output of, among texts in a characteristic text set designated by a user from which a representative example is to be output, text which has a less possibility of being erroneously considered to satisfy a characteristic condition due to a recognition error in the text as a representative example.

The reason is that among the texts in the characteristic text set designated by the user, text whose reliability of a recognition result of a word included in a characteristic condition defining the characteristic text set (i.e. a part playing an important role in extraction of the characteristic in text mining) and its proximity part, or of the text as a whole is high is output as a representative example.

The third effect is enabling, by seeing a degree of assurance of a representative example of a characteristic text set designated by a user which is output together with the representative example, whether the characteristic text set and a characteristic condition defining the same are appropriate mining results or not to be estimated to some extent.

The reason is that in the characteristic text set designated by the user, output as a representative example is text whose degree of assurance is the highest indicating to what extent reliable is, as a recognition result, a word included in a characteristic condition defining the characteristic text set (i.e. a part playing an important role in extraction of the characteristic in text mining) and its proximity part, or text as a whole. Therefore, when the degree of assurance which is output together with the representative example is low, other texts of the characteristic text set are also low in the degree of assurance, so that it can be found that the characteristic text set has a great possibility of being affected by a recognition error at the time of the text mining.

Each of the above-described exemplary embodiments produces the following functional effects.

The text selection unit reads a reliability of each text searched by the text mining unit 202 from the word reliability storage unit 304 and, based on the reliability, selects a part of texts from a plurality of texts searched by the text mining unit 202.

For each text of the same class, the text selection unit also generates a degree of assurance indicative of a degree of correlation between the text of the same class and non-text data from which the text of the same class originates based on the reliability of the text of the same class to select text of the same class having the highest degree of assurance from among the plurality of texts of the same class.

Therefore, it is possible to select text whose reliability is high derived from formation of non-text data into text as a representative example of the plurality of texts.

According to the above-described invention, based on reliability of each text of the same class searched by text mining, a part of texts of the same class can be selected from a plurality of texts of the same class. It is therefore possible to select text of the same class whose reliability is high derived from formation of non-text data into text as a representative example of the plurality of texts of the same class.

It is accordingly possible to provide a user with, as a representative example of a plurality of texts of the same class having the same characteristic, text of the same class which has a reduced number of errors therein and whose contents are easy to understand.

It is also possible to prevent provision of text erroneously considered to have a characteristic in question due to a recognition error in the text to a user as a representative example of text of the same class.

The above-described invention enables selection of text of the same class whose reliability is high derived from formation of non-text data into text as a representative example of a plurality of texts of the same class.

According to the present invention, based on reliability of a word used as a characteristic, a part of texts of the same class are selected from among a plurality of texts of the same class. It is therefore possible to select text of the same class whose reliability in characteristics is high.

Words in proximity to a word indicative of a characteristic have a great possibility of having a high degree of association with the word indicative of the characteristic. The above-described invention therefore enables high-precise selection of text of the same class whose reliability is high derived from formation of non-text data into text to be selected with high precision as a representative example of a plurality of texts of the same class.

The above-described invention enables text of the same class whose reliability is high derived from formation of non-text data into text to be selected with high precision as a representative example of a plurality of texts of the same class.

The above-described invention enables a user to determine whether a characteristic which is used for searching text of the same class and the searched text of the same class are appropriate or not by referring to a degree of assurance of a part of texts of the same class.

The above-described invention allows the above-described text mining method to be executed by the above-described computer.

The present invention enables text whose reliability is high derived from formation of non-text data into text to be selected as a representative example of a plurality of texts.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Incorporation By Reference

This application is based upon and claims the benefit of priority from Japanese patent application No. 2005-356074, filed on Dec. 9, 2005, the disclosure of which is incorporated herein in its entirety by reference.

Industrial Applicability

The present invention is applicable for use as a mining system which extracts useful knowledge including defect information and problems to be solved from inquiry data recorded at a call center and document data on paper including reports, and as a program for realizing the mining system. The present invention is also applicable to such a system as, with inquiry contents applied in voice or characters accumulated as texts, extracts an inquiry frequently appearing from the text to set up a Q&A book.

The invention claimed is:

1. A text mining device, including:
a text set storage unit configured to store a plurality of text obtained by forming a plurality of non-text data into the plurality of text;
a reliability storage unit configured to store an all-class reliability of each of the plurality of text stored in said text set storage unit, said all-class reliability being derived from the formation of said plurality of non-text data into said plurality of text;
a text mining unit configured to search the plurality of text for a plurality of text of a same class, where said plurality of text of the same class has a characteristic the same as the plurality of text stored in said text set storage unit; and
a text selection unit configured to read a same-class reliability of each of said plurality of text of the same class searched by said text mining unit from said reliability storage unit, and configured to select a part of said plurality of text of the same class from the plurality of text of the same class based on the same-class reliability, wherein
said text selection unit generates, for each of said plurality of text of the same class, a degree of assurance indicative of a degree of correlation between said plurality of text of the same class and said plurality of non-text data based on the same-class reliability of said plurality of text of the same class, and selects a portion of said plurality of text of the same class having the highest degree of assurance as said part of said plurality of text of the same class from among said plurality of text of the same class.

2. The text mining device according to claim 1, wherein said text mining unit uses a word as said characteristic, and said text selection unit reads, for each of said plurality of text of the same class, said same-class reliability of said word used as said characteristic from said reliability storage unit; and generates, for each of said plurality of text of the same class, said degree of assurance based on the same-class reliability of the word used as said characteristic.

3. The text mining device according to claim 1, wherein said text mining unit uses a word as said characteristic, and said text selection unit reads, for each of said plurality of text of the same class, said same-class reliability of said word used as said characteristic and a proximate-word reliability of a word in proximity to the word used as said characteristic from said reliability storage unit; and generates, for each of said plurality of text of the same class, said degree of assurance based on said same-class reliability of the word used as said characteristic and said proximate-word reliability of the word in proximity to the word used as said characteristic.

4. The text mining device according to claim 1, wherein said text mining unit uses a word as said characteristic, and said text selection unit reads, for each of said plurality of text of the same class, said same-class reliability of all words in said plurality of text of the same class from said reliability storage unit; and generates, for each of said plurality of text of the same class, said degree of assurance based on said same-class reliability of all the words in said plurality of text of the same class.

5. The text mining device according claim 1, wherein said text selection unit includes
a degree of assurance calculating unit for generating, for each of said plurality of text of the same class, said degree of assurance indicative of said degree of correlation between said plurality of text of the same class and said plurality of non-text data based on the same-class reliability of said plurality of text of the same class, and
a degree of assurance output unit for outputting said degree of assurance together with said part of said plurality of text of the same class.

6. A text mining method to be executed by a text mining device having a text set storage unit configured to store a plurality of text obtained by forming a plurality of non-text data into the plurality of text and a reliability storage unit configured to store an all-class reliability of each of the plurality of text stored in said text set storage unit, said all-class reliability being derived from the formation of said plurality of non-text data into said plurality of text, including:

a text mining step of searching the plurality of text for a plurality of text of a same class, where said plurality of text of the same class has a characteristic the same as the plurality of texts stored in said text set storage unit; and a text selection step of reading, when said plurality of text of the same class are searched, a same-class reliability of each of said plurality of text of the same class from said reliability storage unit, and selecting a part of said plurality of text of the same class from the plurality of text of the same class based on the same-class reliability, wherein said text selection step including:

a degree of assurance generation step of generating, for each of said plurality of text of the same class, a degree of assurance indicative of a degree of correlation between said plurality of text of the same class and said plurality of non-text data based on the same-class reliability of said plurality of text of the same class; and a selection step of selecting a portion of said plurality of text of the same class having the highest degree of assurance as said part of said plurality of text of the same class from among said plurality of text of the same class.

7. The text mining method according to claim 6, wherein at said text mining step, a word is used as said characteristic, and at said degree of assurance generation step, for each of said plurality of text of the same class, said same-class reliability of said word used as said characteristic is read from said reliability storage unit and for each of said plurality of text of the same class, said degree of assurance is generated based on the same-class reliability of the word used as said characteristic.

8. The text mining method according to claim 6, wherein at said text mining step, a word is used as said characteristic, and at said degree of assurance generation step, for each of said plurality of text of the same class, said same-class reliability of said word used as said characteristic and a proximate-word reliability of a word in proximity to the word used as said characteristic are read from said reliability storage unit and for each of said plurality of text of the same class, said degree of assurance is generated based on said same-class reliability of the word used as said characteristic and said proximate-word reliability of the word in proximity to the word used as said characteristic.

9. The text mining method according to claim 6, wherein at said text mining step, a word is used as said characteristic, and at said degree of assurance generation step, for each of said plurality of text of the same class, said same-class reliability of all words in said plurality of text of the same class are read from said reliability storage unit to generate, for each of said plurality of text of the same class, said degree of assurance based on said same-class reliability of all words in said plurality of text of the same class.

10. The text mining method according to claim 6, wherein said text selection step including:

a degree of assurance generation step of generating, for each of said plurality of text of the same class, said degree of assurance indicative of said degree of correlation between said plurality of text of the same class and said plurality of non-text data based on the same-class reliability of said plurality of text of the same class; and a degree of assurance output step of outputting said degree of assurance together with said part of said plurality of text of the same class.

11. A non-transitory computer readable medium configured to store a text mining program configured to cause a computer to execute text mining processing, said computer is connected to a text set storage unit configured to store a plurality of text obtained by forming a plurality of non-text data into the plurality of text and a reliability storage unit configured to store an all-class reliability for each of the plurality of text stored in said text set storage unit, said all-class reliability being derived from the formation of said plurality of non-text data into said plurality of text, said text mining processing including:

a text mining processing of searching, the plurality of text for a plurality of text of a same class, where said plurality of text of the same class has a characteristic the same as the plurality of text stored in said text set storage unit; and a text selection processing of reading, when said plurality of texts of the same class are searched, a same-class reliability of each of said plurality of text of the same class from said reliability storage unit, and selecting a part of said plurality of text of the same class from the plurality of text of the same class based on the same-class reliability, wherein said text selection processing includes:

a degree of assurance generation processing of generating, for each of said plurality of text of the same class, a degree of assurance indicative of a degree of correlation between said plurality of text of the same class and said plurality of non-text data based on the same-class reliability of said plurality of text of the same class; and a selection processing of selecting a portion of said plurality of text of the same class having the highest degree of assurance as said part of said plurality of text of the same class from among said plurality of text of the same class.

12. The non-transitory computer readable medium configured to store the text mining program according to claim 11, wherein in said text mining processing, a word is used as said characteristic, and in said degree of assurance generation processing, for each of said plurality of text of the same class, said same-class reliability of said word used as said characteristic is read from said reliability storage unit to generate, for each of said plurality of text of the same class, said degree of assurance based on the same-class reliability of the word used as said characteristic.

13. The non-transitory computer readable medium configured to store the text mining program according to claim 11, wherein in said text mining processing, a word is used as said characteristic, and in said degree of assurance generation processing, for each of said plurality of text of the same class, said same-class reliability of said word used as said characteristic and a proximate-word reliability of a word in proximity to the word used as said characteristic are read from said reliability storage unit to generate, for each of said plurality of text of the same class, said degree of assurance based on said same-class reliability of the word used as said characteristic and said proximate-word reliability of the word in proximity to the word used as said characteristic.

14. The non-transitory computer readable medium configured to store the text mining program according to claim 11, wherein in said text mining processing, a word is used as said characteristic, and in said degree of assurance generation processing, for each of said plurality of text of the same class, said same-class reliability of all words in said plurality of text of the same class are read from said reliability storage unit to generate, for each of said plurality of text of the same class, said degree of assurance based on said same-class reliability of all the words in said plurality of text of the same class.

15. The non-transitory computer readable medium configured to store the text mining program according to claim 11, wherein said text selection processing includes:

a degree of assurance generation processing of generating, for each of said plurality of text of the same class, said degree of assurance indicative of said degree of correlation between said plurality of text of the same class and said plurality of non-text data based on the same-class reliability of said plurality of text of the same class; and a degree of assurance output processing of outputting said degree of assurance together with said part of said plurality of text of the same class.

* * * * *